US009525999B2

(12) United States Patent
Godfrey et al.

(10) Patent No.: US 9,525,999 B2
(45) Date of Patent: Dec. 20, 2016

(54) METHOD OF SECURELY TRANSFERRING SERVICES BETWEEN MOBILE DEVICES

(75) Inventors: James Andrew Godfrey, Waterloo (CA); Herbert Anthony Little, Waterloo (CA); Christopher Lyle Bender, Waterloo (CA); Connor Patrick O'Rourke, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1232 days.

(21) Appl. No.: 12/643,160

(22) Filed: Dec. 21, 2009

(65) Prior Publication Data

US 2011/0154041 A1  Jun. 23, 2011

(51) Int. Cl.
| | |
|---|---|
| *H04L 9/32* | (2006.01) |
| *H04W 12/04* | (2009.01) |
| *H04L 9/08* | (2006.01) |
| *H04W 4/00* | (2009.01) |

(52) U.S. Cl.
CPC .............. *H04W 12/04* (2013.01); *H04L 9/083* (2013.01); *H04L 9/0838* (2013.01); *H04L 2209/80* (2013.01); *H04L 2463/062* (2013.01); *H04W 4/00* (2013.01)

(58) Field of Classification Search
CPC .... H04L 29/06707; H04L 9/08; H04L 9/0819; H04W 12/04; H04N 21/26613
USPC ........................................................ 713/171
See application file for complete search history.

(56) References Cited

U.S. PATENT DOCUMENTS

| | | | |
|---|---|---|---|
| 5,081,678 A * | 1/1992 | Kaufman et al. ............. 713/161 |
| 6,421,768 B1 * | 7/2002 | Purpura ........................ 711/164 |
| 6,480,957 B1 * | 11/2002 | Liao et al. ..................... 713/170 |
| 7,434,054 B2 * | 10/2008 | Zick ............................... 713/171 |
| 8,214,642 B2 * | 7/2012 | Baentsch et al. ............. 713/168 |
| 8,650,307 B2 * | 2/2014 | Miller ..................... H04L 29/06 709/227 |
| 2004/0142684 A1 | 7/2004 | Ratert et al. |
| 2005/0125684 A1 * | 6/2005 | Schmidt ........................ 713/200 |
| 2007/0160201 A1 * | 7/2007 | Blom et al. .................... 380/30 |
| 2008/0170690 A1 | 7/2008 | Tysowski |

(Continued)

FOREIGN PATENT DOCUMENTS

| | | |
|---|---|---|
| DE | 1020080275792 | 12/2009 |
| EP | 1487228 | 12/2004 |
| WO | 037286 | 4/2008 |

OTHER PUBLICATIONS

Communication pursuant to Article 94(3) EPC from the European Patent Office for corresponding European Patent Application 09180245.4-1525 dated Apr. 18, 2012.

(Continued)

*Primary Examiner* — Esther B Henderson
(74) *Attorney, Agent, or Firm* — Ridout & Maybee LLP

(57) ABSTRACT

A method for securely transferring a service from a first mobile device to a second mobile device, the service being associated with a server configured for facilitating provisioning of services to mobile devices over a wireless communications network. The method includes generating in the first mobile device a shared key, the shared key being generated using a master key unique to the server and to the first mobile device, the master key being accessible by the server and by the first mobile device; and sending said shared key from the first mobile device to the second mobile device using an alternate communication mechanism independent from the server.

22 Claims, 7 Drawing Sheets

(56) References Cited

U.S. PATENT DOCUMENTS

| | | |
|---|---|---|
| 2008/0171578 A1 | 7/2008 | Tysowski |
| 2008/0267395 A1* | 10/2008 | Deishi ............................ 380/44 |
| 2009/0144202 A1* | 6/2009 | Hurry ............................ 705/67 |
| 2009/0287922 A1* | 11/2009 | Herwono et al. ............. 713/155 |
| 2011/0145897 A1* | 6/2011 | Tyree ............................... 726/6 |

OTHER PUBLICATIONS

Office Action dated Nov. 9, 2012 for the corresponding Canadian Patent Application No. 2,721,890.

* cited by examiner

METHOD OF SECURELY TRANSFERRING SERVICES BETWEEN MOBILE DEVICES

FIELD

Example embodiments described herein generally relate to the transferring of services between mobile devices.

BACKGROUND

In some existing wireless networks, a user may wish to switch or transfer mobile devices. Typically a user will have services registered on their old device and policy restrictions enforced that would need to be enabled on the new device. This data cannot be merely copied off the source device as it would it would potentially expose key information to an attacker. Further, in order to perform the transfer the user typically has to inform each of the services of the new mobile device, either by contacting the administrator to receive an activation password, or connecting to a trusted computer. This is inconvenient to the user since it restricts the location or time when they can perform a switch.

Other difficulties of existing systems may also be appreciated in view of the foregoing.

BRIEF DESCRIPTION OF THE DRAWINGS

Like reference numerals may be used in the drawings to denote like elements and features.

DETAILED DESCRIPTION OF EXAMPLE EMBODIMENTS

Example embodiments relate to securely transferring of a service from a first "source" mobile device to a second "target" mobile device. Reference to transferring of the service may include service data being communicated from the first mobile device to the second mobile device. Once the service data is stored on the second mobile device, the service may become activated within the second mobile device.

In an example embodiment, there is provided a method for transferring a service from a first mobile device to a second mobile device, the service being associated with a server configured for facilitating provisioning of services to mobile devices over a wireless communications network. The method includes: generating in the first mobile device a shared key, the shared key being generated using a master key unique to the server and to the first mobile device, the master key being accessible by the server and by the first mobile device; and sending said shared key from the first mobile device to the second mobile device using an alternate communication mechanism independent from the server.

In another example embodiment, there is provided a mobile device, which includes a controller for controlling operation of the device, a communication subsystem connected to the controller configured for data communication with a wireless communication network, the wireless communication network including a service associated with a server configured for facilitating provisioning of services to mobile devices over the wireless communications network, and a memory for storage of data and accessible by the controller. The controller is configured for: generating a shared key, the shared key being generated using a master key unique to the server and to the first mobile device, the master key being accessible by the server and by the first mobile device, and sending said shared key from the first mobile device to a second mobile device using an alternate communication mechanism independent from the server.

In yet another example embodiment, there is provided a communication system, which includes a first mobile device and a server. The server is configured for facilitating provisioning of services to mobile devices including the first mobile device over a wireless communications network, wherein the server is configured for generating a shared key using a master key unique to the server and to the first mobile device, the master key being accessible by the server and by the first mobile device. The first mobile device is configured for generating the shared key using the master key, and sending said shared key to a second mobile device using an alternate communication mechanism independent from the server.

Figure 1:
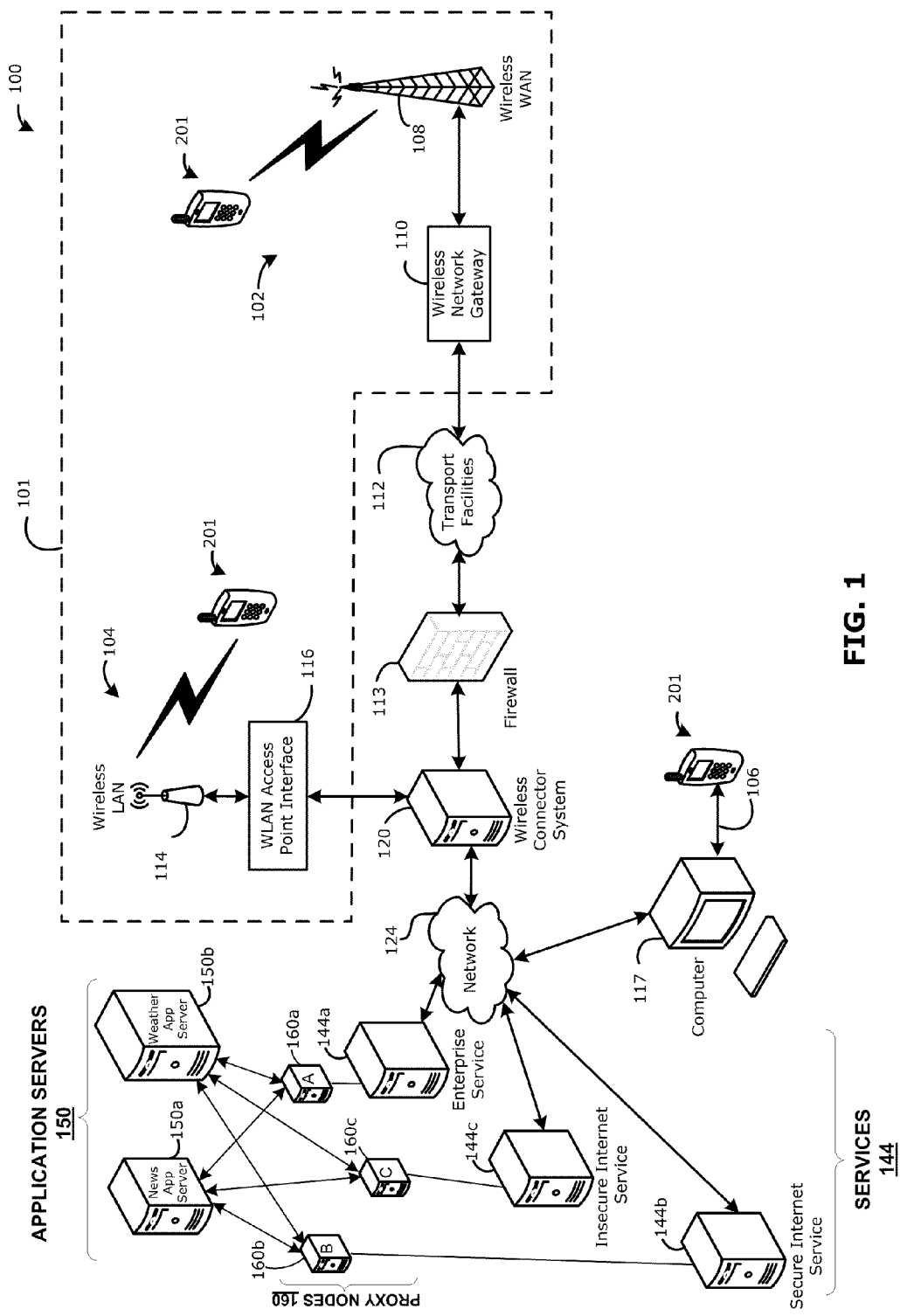
FIG. 1 shows a block diagram illustrating a communication system including services in accordance with an example embodiment.

Reference is made to FIG. 1, which shows, in block diagram form, a communication system 100 in which example embodiments may be applied. The communication system 100 includes a number of mobile communication devices ("mobile devices") 201, which may be connected to the remainder of system 100 in any of several different ways. Accordingly, several instances of mobile devices 201 are depicted in FIG. 1 as employing different example ways of connecting to system 100. Mobile devices 201 are connected to a wireless communication network 101, which may include one or more of a Wireless Wide Area Network (WWAN) 102, a Wireless Local Area Network (WLAN) 104, or any other suitable network arrangements. In some embodiments, the mobile devices 201 are configured to communicate over both the WWAN 102 and WLAN 104, and to roam between these networks. In some embodiments, the wireless network 101 may include multiple WWANs 102 and WLANs 104.

The WWAN 102 may be implemented as any suitable wireless access network technology. By way of example, but not limitation, the WWAN 102 may be implemented as a wireless network that includes a number of base stations 108 (one of which is shown in FIG. 1), each containing radio transmitting and receiving equipment adapted to provide wireless radio-frequency (RF) network service or "coverage" to a corresponding area or cell. The WWAN 102 is typically operated by a mobile network service provider that provides subscription packages to users of the mobile devices 201. The WWAN 102 may be implemented as any appropriate wireless network, including, but not limited to, any to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"). Other network types and technologies could also be used. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

A wireless network gateway 110 may be associated with the WWAN 102 to connect the mobile devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile devices 201 and other devices (not shown) connected, directly or indirectly, to the WWAN 102. Accordingly, communications sent via the mobile devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile devices 201.

The WLAN 104 includes a wireless network which, in some embodiments, conforms to IEEE 802.11x standards (sometimes referred to as Wi-Fi) such as, for example, any or all of the IEEE 802.11a, 802.11b, 802.11g, or 802.11n standards. Other communication protocols may be used for the WLAN 104 in other embodiments such as, for example, IEEE 802.16e (also referred to as Worldwide Interoperability for Microwave Access or "WIMAX"), or IEEE 802.20 (also referred to as Mobile Wireless Broadband Access). The WLAN 104 includes one or more wireless RF Access Points (AP) 114 (one of which is shown in FIG. 1) that collectively provide WLAN service or "coverage" over an area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116, which may connect to the wireless connector system 120 directly (for example, if the access point 114 is part of an enterprise WLAN 104 in which the wireless connector system 120 resides), or indirectly (not shown) via the transport facilities 112 if the access point 14 is a personal Wi-Fi network or Wi-Fi hotspot (in which case, a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including e-mail messages, to and from a set of managed mobile devices 201. The wireless connector system 120 also provides administrative control and management capabilities over users and mobile devices 201 which may connect to the wireless connector system 120.

The wireless connector system 120 typically provides a secure exchange of data (e.g., e-mail messages, personal information manager (PIM) data, and IM data) with the mobile devices 201. In some embodiments, communications between the wireless connector system 120 and the mobile devices 201 are encrypted.

The network 124 may include a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may include one or both of a physical interface and short-range wireless communication interface. The physical interface may include one or combinations of an Ethernet connection, Universal Serial Bus (USB) connection, Firewire™ (also known as an IEEE 1394 interface) connection, a conventional serial protocol, desktop cradle, or any other appropriate data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may include one or a combination of an infrared (IR) connection such as an Infrared Data Association (IrDA) connection, a short-range radio frequency (RF) connection such as one specified by IEEE 802.15.1, sometimes referred to as "BLUETOOTH", or IEEE 802.15.3a, also referred to as Ultra-Wideband (UWB), or any other appropriate PAN connection.

It will be appreciated that the above-described communication system is provided for the purpose of illustration only, and that the above-described communication system includes one possible communication network configuration of a multitude of possible configurations for use with the mobile devices 201. The teachings herein may be employed in connection with any other type of network and associated devices that are effective in implementing or facilitating wireless communication. Suitable variations of the communication system will be understood to a person of skill in the art.

Figure 2:
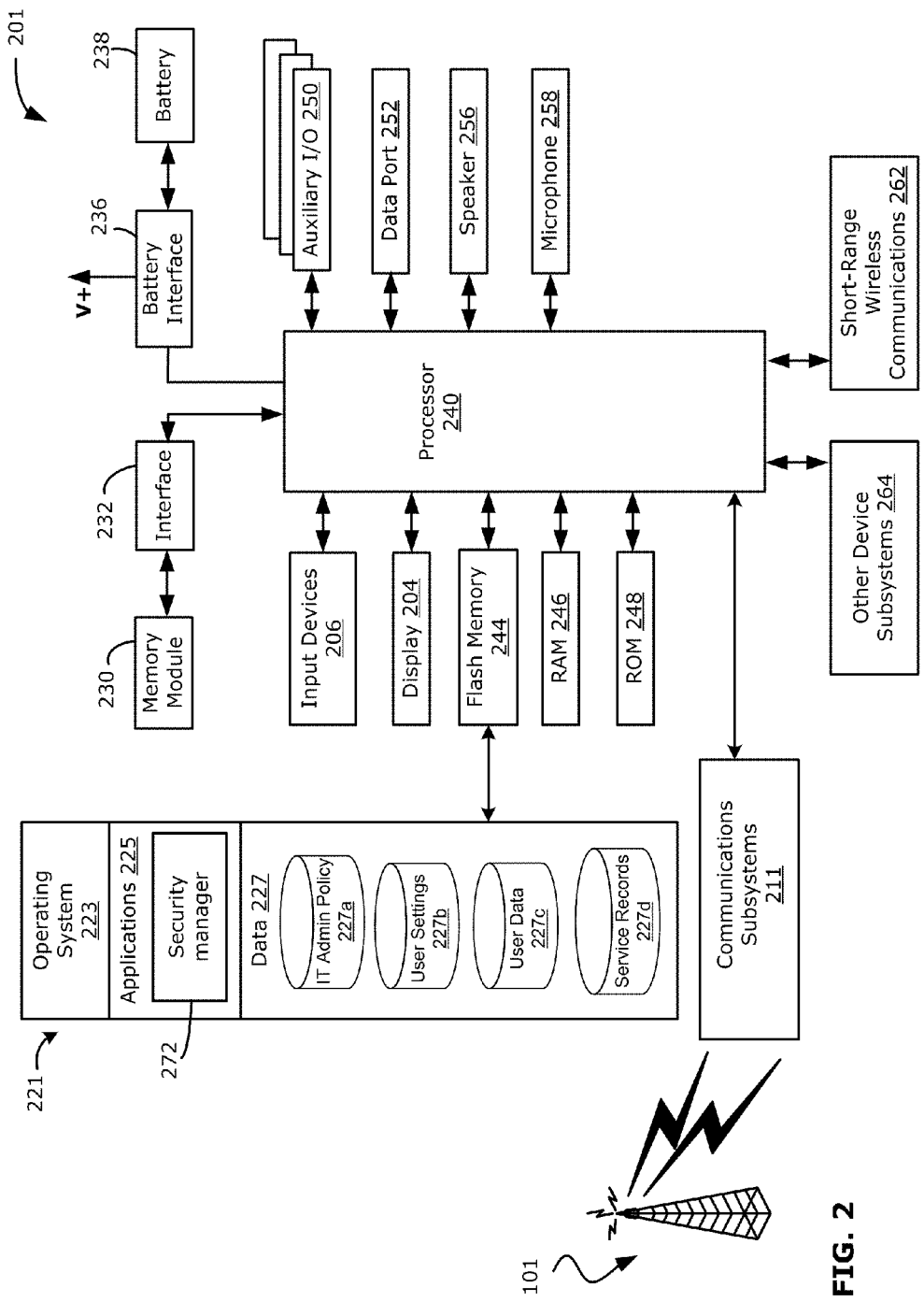
FIG. 2 shows a block diagram illustrating a mobile communication device in accordance with an example embodiment.

Reference is now made to FIG. 2 which illustrates a mobile device 201 in which example embodiments can be applied. The mobile device 201 is a two-way communication device having data and voice communication capabilities, and the capability to communicate with other computer systems, for example, via the Internet. Depending on the functionality provided by the mobile device 201, in various embodiments the mobile device 201 may be a handheld device, a multiple-mode communication device configured for both data and voice communication, a smartphone, a mobile telephone or a PDA (personal digital assistant) enabled for wireless communication.

The mobile device 201 includes a rigid case (not shown) housing the components of the mobile device 201. The internal components of the mobile device 201 may, for example, be constructed on a printed circuit board (PCB). The description of the mobile device 201 herein mentions a number of specific components and subsystems. Although these components and subsystems may be realized as discrete elements, the functions of the components and subsystems may also be realized by integrating, combining, or packaging one or more elements in any suitable fashion. The mobile device 201 includes a controller including at least one processor 240 (such as a microprocessor) which controls the overall operation of the mobile device 201. The processor 240 interacts with device subsystems such as a wireless communication subsystem 211 for exchanging radio frequency signals with the wireless network 101 to perform communication functions. The processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which may employ any appropriate a wireless (e.g., RF), optical, or other short range communications technology), and other device subsystems generally designated as 264. Some of the subsystems shown in FIG. 2 perform communication-related functions, whereas other subsystems may provide "resident" or on-device functions.

Display 204 may be realized as a touch-screen display in some embodiments. The touch-screen display may be constructed using a touch-sensitive input surface connected to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 108 and wireless LAN access points 114 within the wireless network 101. The particular design of the wireless communication subsystem 211 depends on the wireless network 101 in which mobile device 201 is intended to operate. The mobile device 201 may send and receive communication signals over the wireless network 101 after the required network registration or activation procedures have been completed.

The processor 240 operates under stored program control and executes software modules 221 stored in memory such as persistent memory 244 or ROM 248. ROM 248 may contain data, program instructions or both. Persistent memory 244 may contain data, program instructions or both, in some embodiments is rewritable under control of processor 240, and may be realized using any appropriate persistent memory technology, including EEPROM, EAROM, FLASH, and the like. As illustrated in FIG. 2, the software modules 221 comprise operating system software 223 and software applications 225.

Software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may further include a range of applications, including, for example, an e-mail messaging application, address book, calendar application, notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (i.e., the display 204) according to the application.

In some embodiments, the auxiliary input/output (I/O) subsystems 250 may comprise an external communication link or interface, for example, an Ethernet connection. The auxiliary I/O subsystems 250 may further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 201 (e.g., receipt of an electronic message or incoming phone call), or for other purposes such as haptic feedback (touch feedback).

In some embodiments, the mobile device 201 also includes one or more removable memory modules 230 (typically including FLASH memory) and one or more memory module interfaces 232. Among possible functions of the removable memory module 230 is to store information used to identify or authenticate a user or the user's account to wireless network 101. For example, in conjunction with certain types of wireless networks, including GSM and successor networks, the removable memory module 230 is referred to as a Subscriber Identity Module or SIM. In some example embodiments, the memory module 230 includes a uSD card. The memory module 230 is inserted in or connected to the memory module interface 232 of the mobile device 201 in order to operate in conjunction with the wireless network 101.

The mobile device 201 also includes a battery 238 which furnishes energy for operating the mobile device 201. The battery may be coupled to the electrical circuitry of mobile device 201 through a battery interface 236, which may manage such functions as charging the battery from an external power source (not shown) and the distribution of energy to various loads within or connected to the mobile device 201. Short-range communication subsystem 262 is an additional optional component which provides for communication between the mobile device 201 and different systems or devices, which need not necessarily be similar devices. For example, the short-range communication subsystem 262 may include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system software 223 or software applications 225 may also be loaded onto the mobile device 201 through the wireless network 101, the auxiliary I/O subsystem 250, the data port 252, the short-range communication subsystem 262, or other suitable subsystem such as 264. The downloaded programs or code modules may be permanently installed, for example, written into the program memory (e.g., the persistent memory 244), or written into and executed from the RAM 246 for execution by the processor 240 at runtime.

The mobile device 201 may provide two principal modes of communication: a data communication mode and an optional voice communication mode. In the data communication mode, a received data signal such as a text message, an e-mail message, Web page download, or an image file will be processed by the wireless communication subsystem 211 and input to the processor 240 for further processing. For example, a downloaded Web page may be further processed by a browser application or an e-mail message may be processed by an e-mail message messaging application and output to the display 204. A user of the mobile device 201 may also compose data items, such as e-mail messages, for example, using the input devices in conjunction with the display 204. These composed items may be transmitted through the wireless communication subsystem 211 over the wireless network 101. In the voice communication mode, the mobile device 201 provides telephony functions and operates as a typical cellular phone.

Referring again to FIG. 1, the wireless connector system 120 allows the mobile devices 201 to access the network 124 and connected resources and one or more remote services 144. The services 144 may be in communication with one or more application servers 150 through proxy nodes 160a, 160b, 160c, wherein the services 144 may facilitate provisioning of various services and server-based applications from the application servers 150 to the mobile device 201. The proxy nodes 160 may be third-party intermediate servers. Such application servers 150 (or their corresponding applications) may sometimes be referred to as application services, enterprise applications, remote applications, or simply as an "APP" or "APPS".

Referring still to FIG. 1, the services 144 may include one or more enterprise services (e.g., one shown as enterprise service 144a) and one or more Internet services (e.g., shown as secure Internet service 144b and insecure Internet service 144c). Generally, the services 144 include one or more servers which act as a centralized gateway or link between the mobile device 201 and the application servers 150, either directly or via proxy nodes 160. The services 144 communicate data and information between the application servers 150 and the mobile devices 201 when the mobile device 201 is executing or running a particular application. Additional example functions provided by the services 150 include over-the-air transport and data synchronization, security, access and management policies, advanced security features including end-to-end data encryption and outbound initiated connections, push services, and centralized management and administration services for managing various aspects of the service including server components, users and application settings. The services 144 also facilitate transferring or activation of that service between mobile devices 201, as described in further detail herein.

The enterprise service 144a may, for example, include an e-mail messaging server implementing Microsoft EXCHANGE, IBM LOTUS DOMINO, or Novell GROUPWISE. The enterprise service 144a provides services that are not strictly limited to messaging, including services that support applications related to the application servers 150 directly or indirectly via proxy nodes 160. Some such enterprise services 144a are also referred to as "groupware" servers. The Internet services 144b, 144c may include communication with the application servers 150 directly or indirectly via proxy nodes 160, for implementing applications such as instant messaging (IM) applications, e-mail (such as web-based e-mail), voice mails, appointments, task items, and calendar events. Each Internet service 144b, 144c may also include a content server for providing content such as internet content or content from an organization's internal servers to the mobile devices 201 in the wireless network 101. Although services 144 are depicted in FIG. 1 as implemented via discrete servers, the services 144 may be distributed or integrated over any appropriate number and topology of servers.

The application servers 150 may be provided by third-party providers which are independently operated and hosted remotely from the services 144 or from proxy nodes 160. As shown in FIG. 1, the application servers 150 are shown in direct communication with services 144 via proxy nodes 160 for ease of reference, however in many embodiments the application servers 150 may in fact communicate through network 124 or communicate directly with services 144. In some embodiments, some of the application servers 150 may be locally hosted by the particular service 144 (e.g., resident on the same server device) or may be hosted in the same LAN/network.

For example, as shown in FIG. 1, the application servers 150 may include a news app server 150a and a weather app server 150b. For example, the news app server 150a may push or provide news feeds for operation of a corresponding news application resident in the mobile device 201, for displaying daily news items on the mobile device 201. The weather app server 150b may, for example, push or provide weather updates, both present as well as forecasted, to a weather application resident on of the mobile device 201, for displaying on the mobile device 201.

Examples of further example applications provided by application servers 150 include consumer applications including games (including single player games and multi-player games), ringtones and wallpapers, music and audio, television, movies and video, sports, news and information, news and RSS, weather and travel, search and reference guides, medical guides and calculators, maps and travel, maps and navigation, travel companions, city and dining guides, mileage and expense tracking, health and fitness, health and nutrition, personal fitness, personal banking, stocks and financial news, time and expense tracking, photo management, documents and printing, task, contact and calendar management, time, expense and mileage tracking, clocks, calculators and other utilities, voice commands and voice recognition, social networking and instant messaging, conferencing and phone services, add-on accessories, GPS (Global Positioning System), digital pen and paper, and presentation and screen projection. Additional applications include business or enterprise applications including mobile solutions for line-of-business, sales force automation, field service automation and GPS tracking, remote IT help desk, custom ERP (Enterprise Resource Planning) solutions, SCM (Supply Chain Management) and process management, business intelligence (analytics, reporting and alerting), mobile forms and custom developer tools, industry-specific mobile solutions such as financial services, health care government, law enforcement and public safety, professional services and legal, real estate, education, retail/wholesale, hospitality and leisure, manufacturing, hosted solutions for small-medium business and large enterprise such as hosted sales force automation, hosted field service automation and fleet management, hosted mobile forms and custom business solutions, hosted document management, hosted email and collaboration, employee productivity, document and content management, printing and faxing, business productivity tools and task management, navigation and mapping, unified communications and voice services. The particular design and configuration of the application servers 150 would be readily understood by those skilled in the art and is not described in detail herein, and is intended to encompass future-developed applications provide by application servers 150.

The wireless network gateway 110 is configured to send data packets received from the mobile device 201 over the WWAN 102 to the wireless connector system 120. The wireless connector system 120 then sends the data packets to the appropriate connection point such as one of the services 144. Conversely, the wireless connector system 120 sends data packets received, for example, from the enterprise service 144a or the Internet services 144b, 144c to the wireless network gateway 110 which then transmits the data packets to the destination mobile device 201. The AP interfaces 116 of the WLAN 104 provide similar sending functions between the mobile device 201, the wireless connector system 120 and network connection point such as the enterprise service 144a and the Internet services 144b, 144c. In further example embodiments, a user may concurrently or alternatively access the services 144 through the computer 117.

Example systems and methods for transferring of a service between mobile devices 201 in accordance with example embodiments will now be described in detail. Referring to FIG. 2, the mobile device 201 stores data 227 in a persistent memory 244. As shown, the data 227 may include IT administrative policy settings 227a, user settings 227b, and/or user data 227c. In various embodiments, the data 227 also includes service data within service records 227d comprising information required by the mobile device 201 to establish and maintain communication with a particular service within the wireless network 101. In example embodiments, service records 227d may also be used to activate an associated service within the mobile device 201. In some embodiments, data 227 may also include applications.

Referring now to FIGS. 1 and 2, in order to communicate with a specified service 144, each service book within service records 227d may relate to a corresponding service 144. For example, the service records 227d may store a service books in relation to each of the enterprise service 144a and secure Internet service 144b.

An example service book includes the following service records, which may be required or optional depending on the needs of the particular service 144 or application server 150. In an example embodiment, required service records may include Service Name, Service Unique Identifier (UID), Content Identifier (CID), and Certificate Authority Realm, and optional service records 310 may include account address, home address, network level address, application data, compression mode, encryption mode, acknowledgement data structure, Service gateway key data, host routing data structure, current host routing information, record source, service description, data source id (DSID), routing information, user id (USID), service source id, and record type. Other required and optional service records may be appropriate for other embodiments. As can be appreciated, in some embodiments, a relatively large amount of service configuration information may be communicated and implemented from each service book.

Referring still to FIG. 2, in example embodiments, the software applications 225 includes a security manager 272. Generally, in example embodiments, the security manager 272 may be configured to facilitate transferring of a service 144 to a target mobile device, or receiving transfer of a service 144 from a source mobile device. The security manager 272 may also communicate with the particular service 144 or another mobile device. The security manager 272 may also perform encrypting/decrypting or signing/authentication functions of the data 227 and other information in accordance with example embodiments, as described in detail herein. The security manager 272 may also be referred to as a "thick client" because of the various functionality provided. Various functions or components of the security manager 272 may or may not be required for operation of the device 201, depending on whether the device is the source mobile device or the target mobile device. In some embodiments, the security manager 272 may also be integrated within one or more of the other specified applications 225. In other embodiments, it is the operating system 223 that performs some or all of the functions of the security manager 272.

Figure 3:
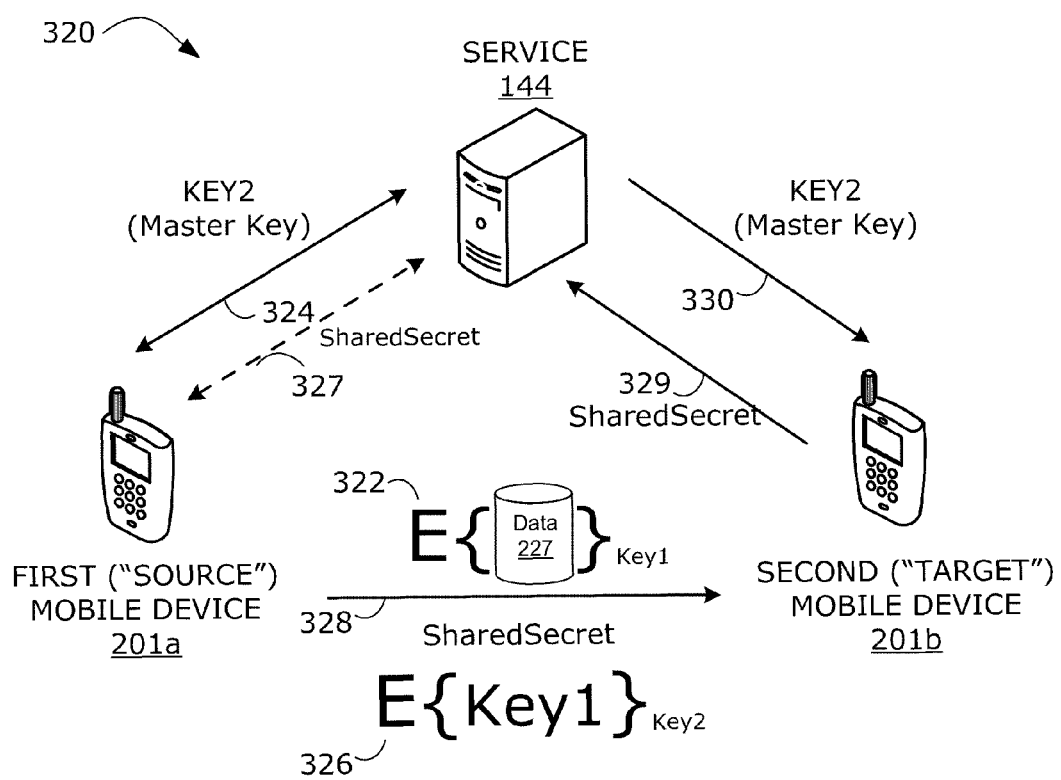
FIG. 3 shows an example block system diagram and associated process illustrating transferring of a service between mobile devices, in accordance with an example embodiment.

Reference is now made to FIG. 3, which shows an example block system 320 and associated process illustrating transferring of a service 144 from a first mobile device 201a to a second mobile device 201b, in accordance with an example embodiment. Reference to transferring of the service may include data 227 being communicated from the first mobile device 201a to the second mobile device 201b. Once the data 227 is stored on the second mobile device 201b, the service 144 may become activated within the second mobile device 201b. For convenience of reference, encryption or signing may be referenced by using the symbol or function "$E\{\ \}_{Key}$", while decryption or authentication/verification may be referenced by using the symbol or function "$D\{\ \}_{Key}$". Reference to keys may include either encryption keys or signing keys, or both, as would be understood in the art.

Generally, at process 322, the first mobile device 201a encrypts or signs the data 227 using a first key ("Key 1"), resulting in encrypted or signed data 227 (sometimes merely referred to as "encrypted data" for ease of reference). At process 324, a second key ("Key 2") is stored and accessible by both the first mobile device 201a and the service 144. At process 326, the first mobile device 201a encrypts the first key Key1 using the second key Key2 resulting in an encrypted first key Key1. At process 327, a SharedSecret key may be generated separately by both the first mobile device 201a and the service 144 (shown as dashed line as in some embodiments no actual data is transferred or negotiated). At process 328, the first mobile device 201a sends the encrypted data 227, the encrypted first key Key1, and the SharedSecret key to the second mobile device 201b using an alternate communication mechanism independent from the service 144. At process 329, the second mobile device 201b sends the SharedSecret key to the service 144 for authentication. At process 330, the service 144, upon authentication of the SharedSecret key, sends the second key Key2 to the second mobile device 201b over the wireless network 101. The second key Key2 is used to decrypt the Key1, which is used to decrypt the data 227.

In some embodiments, the Key2 is or includes a master key MasterKey which may already be established between the first mobile device 201a and the service 144. If there are multiple secure services each having master keys available to a mobile device 201, any one of the master keys could be used as the Key2.

Typically, the alternate communication mechanism shown at process 306 is independent of the service 144, because a relationship has not yet been established between the service 144 and the second target mobile device 201b, and it may not be appropriate or possible to send data to the second mobile device 201b. Examples of the alternate communication mechanisms include removable memory such as a uSD card, short-range wireless connections, Universal Serial Bus (USB), etc. Some example embodiments using the uSD card are described in detail hereinbelow.

Figure 7:
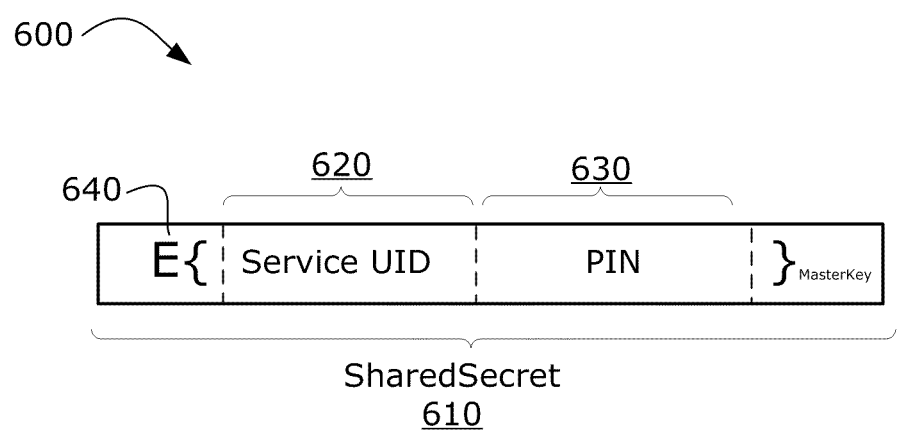
FIG. 7 shows an example data structure of a shared key in accordance with an example embodiment.

Reference is now made to FIG. 7, which shows a data structure 600 of the SharedSecret 610 generated at step 327 (FIG. 3), which may for example be generated and stored in both the first mobile device 201 and the service 144. In example embodiments, the SharedSecret may be generated from commonly accessible information between the first mobile device 201a and service 144a, for example, using a combination of service information such as the Service Unique Identifier (UID) 620 and a unique device identifier such as personal identification number (PIN) 630. This service information is thereafter signed or encrypted using the MasterKey. In one embodiment, as shown in FIG. 7, the SharedSecret may be generated by each of the first mobile device 201 and the service 144 by: concatenating the device PIN 630 and the service UID 620, signing 640 the concatenated device PIN 630 and service UID 620, the signing being performed using the current MasterKey. The signing may for example be performed by using a Hash-based Message Authentication Code (HMAC) (as understood in the art), using the MasterKey. In other embodiments, the MasterKey may be used to encrypt the concatenated device PIN 630 and service UID 620. Referring again to FIG. 3, the process used in generating the SharedSecret may provide that only the first mobile device 201 and the enterprise service 144a could have generated the key, as the master key and unique identifiers of the first mobile device 201a are used. Further, in some example embodiments each of the first mobile device 201 and the enterprise service 144a may independently generate the same SharedSecret key without requiring additional negotiation therebetween.

In other example embodiments, the SharedSecret is negotiated using normal key generation communications between the first mobile device 201a and the enterprise service 144a, as would be understood in the art. The SharedSecret may then be subsequently used on the second mobile device 201b to reactivate the service 144. At this stage, the second mobile device 201b is successfully transferred with respect to the service 144.

Figure 4:
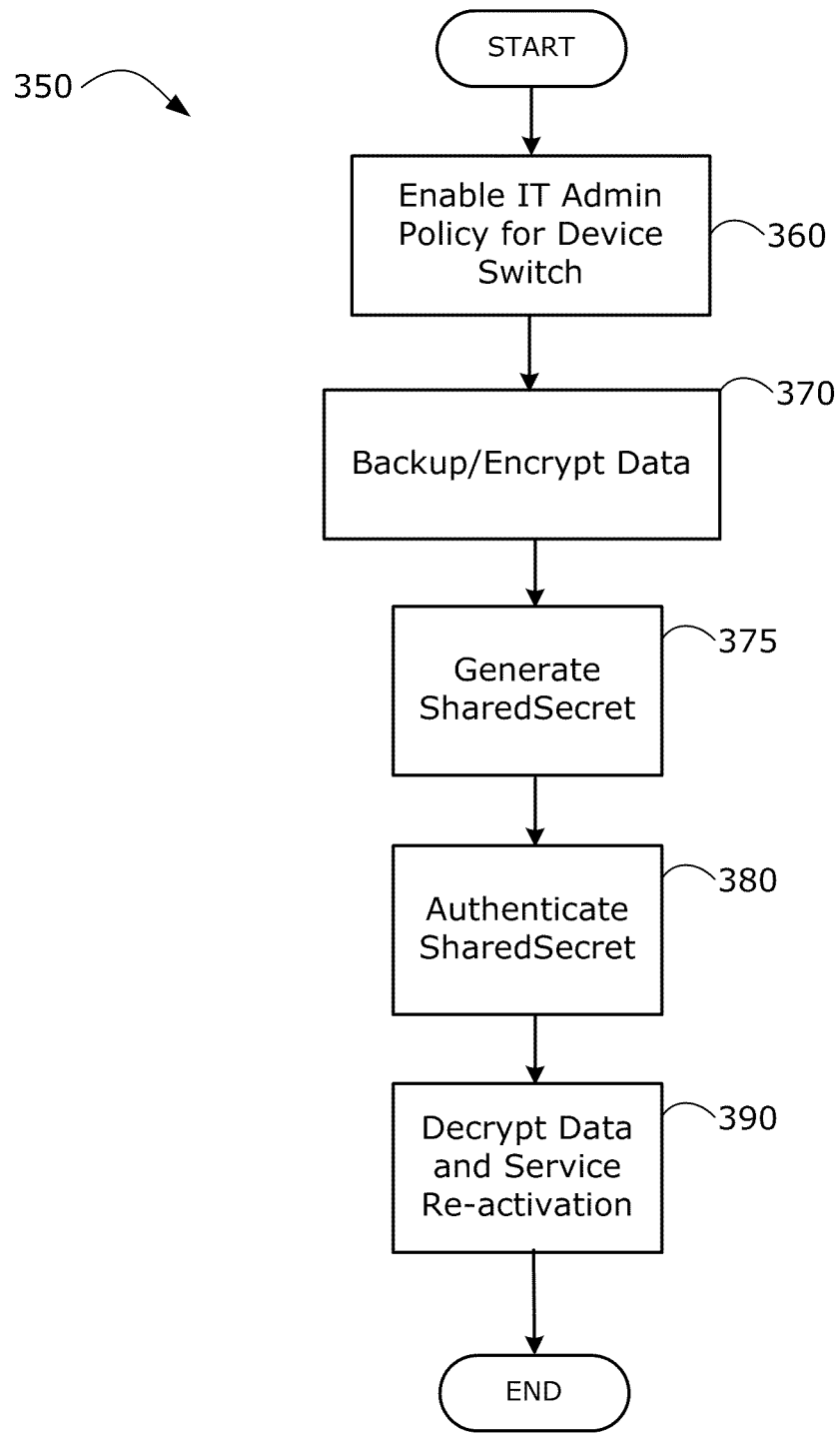
FIG. 4 shows a flow diagram of a process for transferring of services between mobile devices, in accordance with an example embodiment.

Reference is now made to FIG. 4, which shows a flow diagram of a process 350 for transferring of the service 144 from the first mobile device 201a to the second mobile device 201b, with reference to FIG. 3. At process 360, the Information Technology administration ("IT Admin") policy for transferring or "device switching" of a service 144 is enabled in the first mobile device 201a. At process 370, the data 227 is encrypted and may also be backed up onto a removable memory, for sending the encrypted data to the second mobile device 201b using the alternate communication mechanism. Typically, any data 227, including service records 227d, in relation to all desired services 144 are encrypted at this stage. At process 375, a SharedSecret key may be generated by both the first mobile device 201a and the service 144, the SharedSecret being generated using a master key. At process 380, the service 144 authenticates the SharedSecret of the second mobile device 201b and sends the master key to the second mobile device 201b. At process 390, the second mobile device 201b decrypts the encrypted data and may now activate the specified service(s) 144. The type of decryption depends on the specific service 144 and the process in which data 227 was encrypted.

Specifically, with respect to process 360, in order to enable device switching, in some embodiments access to this feature may be controlled through the particular policy of the administrator. The default IT Admin policy setting for device switch is typically disabled so an administrator can ensure suitable security measures are in place, such as a device lock password, prior to enabling this feature. After enabling the IT Admin policy, a user may choose the option of an automatic backup or a user initiate backup prior to performing a switch or transfer. Selecting an automatic backup option will instruct the mobile device 201a to produce a backup copy of device data 227 and settings to the uSD card if present that will be kept in sync with any changes made. Any changes to the data 227 made after the backup copy may be buffered and saved to the backup.

Figure 5:
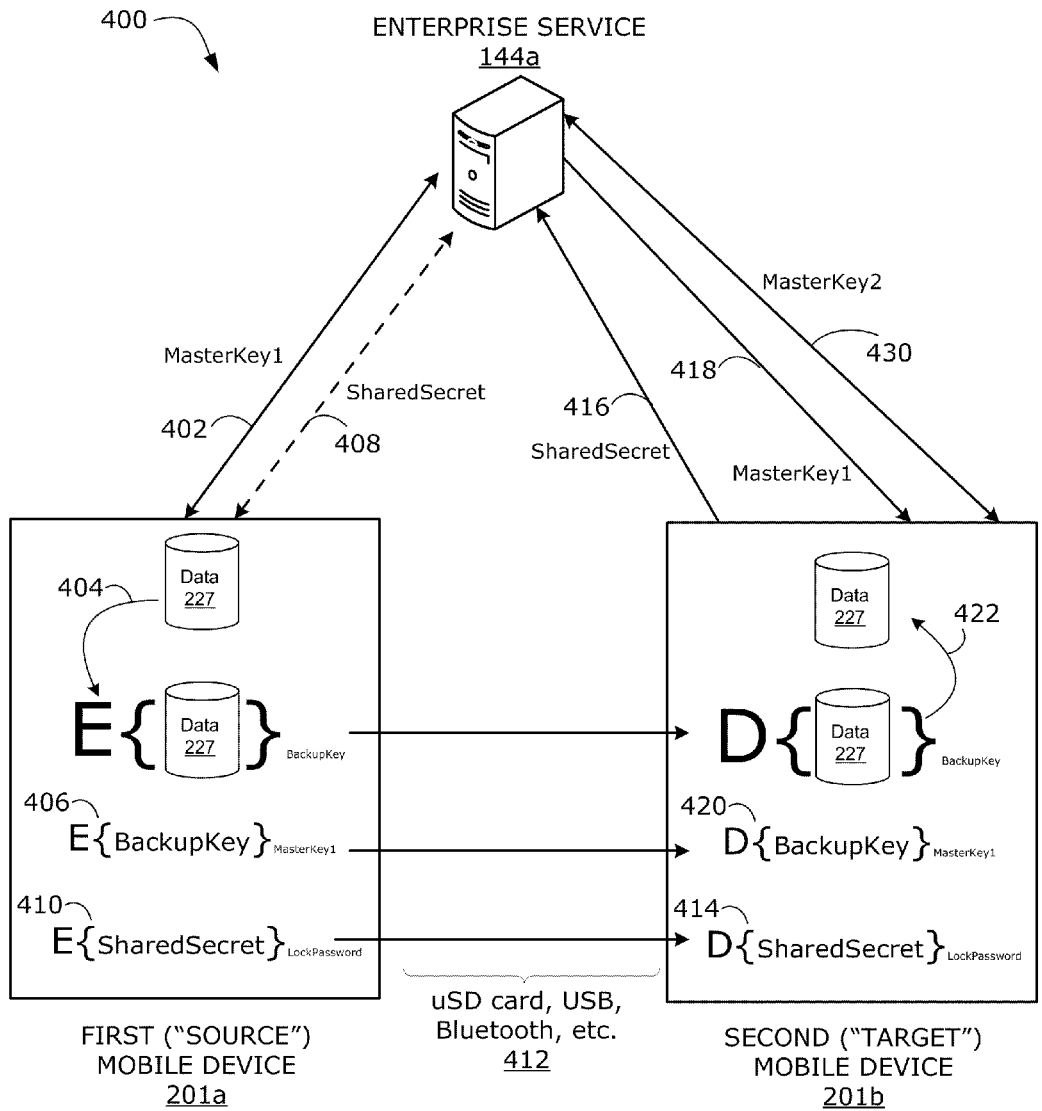
FIG. 5 shows an example detail block system diagram and associated process illustrating transferring of an enterprise service between mobile devices, in accordance with an example embodiment.
Figure 6:
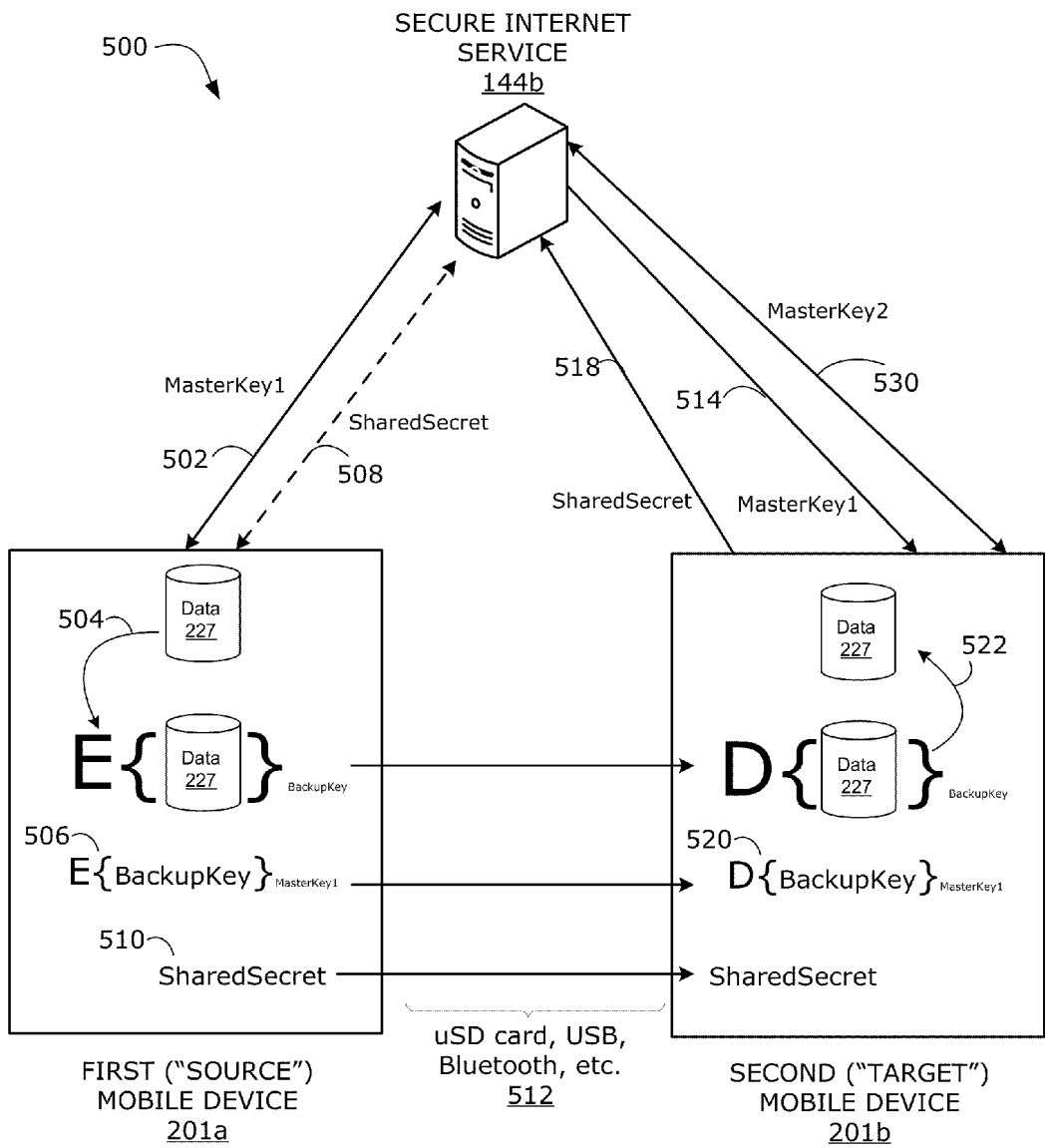
FIG. 6 shows an example detail block system diagram and associated process illustrating transferring of a secure Internet service between mobile devices, in accordance with an example embodiment.

Specific example embodiments of each of service 144a, 144b will now be described individually for ease of illustration, with reference to FIGS. 5 and 6. FIG. 5 illustrates an example service transfer in relation to the enterprise service 144a, while FIG. 6 illustrates an example service transfer in relation to the secure Internet service 144b. Note that, the mobile device 201 may include a separate service book for each of the secure services 144a, 144b. An example embodiment of the differing types of encryption performed for these services 144 is summarized in Table 1.

TABLE 1

| Service | Service UID | Encrypted Backup Key | Encrypted Shared Secret |
| --- | --- | --- | --- |
| Enterprise | S12345 | E{BackupKey}MasterKeyS12345 | E{SharedSecret}LockPassword |
| Secure Internet | GBISXNA01 | E{BackupKey}MasterKeyGBISXNA01 | SharedSecret |

As illustrated in the examples shown in Table 1, the enterprise service 144a may be associated with Service UID S 12345, and the secure Internet service 144b may be associated with Service UID GBISXNA01. When encrypting the particular service records or service books, the first mobile device 201a may record to the uSD card the encrypted copies of the backup key and shared secret in a manner corresponding to the format of Table 1. If automatic backup is enabled, the first mobile device 201a updates the table stored on the uSD card to reflect any changes in the services activated or changes to master keys and device lock passwords. Each service 144 is illustrated as being encrypted in a different manner in accordance with various embodiments, although it may be appreciated that various suitable encryptions may be used depending on the particular service, security requirements, administrative policy, or desired settings, as appropriate. For example, the secure Internet service 144b may be encrypted in a similar manner as the enterprise service 144a with suitable modifications, or vice versa.

Referring now to FIG. 5, the example system 400 illustrates associated processes and communications which may occur as between the first "source" mobile device 201a, the enterprise service 144a, and the second "target" mobile device 201. Referring now to process 402, a master key ("MasterKey1") may be established as between the first mobile device 201a and the enterprise service 144a. Typically, such a master key already exists and is pre-established as between the first mobile device 201a and the enterprise service 144a. The master key is also typically unique to the first mobile device 201a and the enterprise server 144a (e.g., a different master key would typically be established between, for example, the first mobile device 201a and the secure Internet service 144b). At process 404, the first mobile device 201a will generate a key, referred to as a "BackupKey", to encrypt user data 227 and store or backup the encrypted user data 227 onto the uSD card. This for example protects the data 227 from possible loss or theft of the uSD card from the mobile device 201a. In some example embodiments, the data 227 may be stored or backed up using a storage procedure similar to an over-the-air protocol; however, rather than using a master key to communicate with a service 144, the encrypted data 227 is instead stored to the uSD card.

A separate BackupKey may be used in some embodiments because, for example, should only a master key be used, a change or removal of that master key would require the decryption and re-encryption of the encrypted data 227.

In some example embodiments, an Advanced Encryption Standard (AES)-256 key may be used as the BackupKey to provide a suitable security for generating a relatively strong key, as would be understood in the art.

Referring now to process 406, in order to securely transfer the BackupKey from the first mobile device 201a to the second mobile device 201b, the BackupKey is encrypted, for example using the current master key MasterKey1, which is typically already established between the first mobile device 201a and the enterprise service 144a.

Referring now to process 408, since the MasterKey1 associated with the enterprise service 144a should generally not be copied off of the first mobile device 201a for security reasons, another encryption key is generated, referred to as a shared secret key ("SharedSecret"). The first mobile device 201a and the enterprise service 144a may independently compute a shared secret that only each device could derive (thus, process 408 is shown as a dashed line as in some embodiments no actual data is transferred or negotiated). As described above with respect to FIG. 7, the SharedSecret may be generated by signing or encrypting specified service information using the MasterKey1.

Referring to process 410, as with the BackupKey, the SharedSecret associated with the enterprise service 144a may be required to be encrypted before it can be safely transferred using the uSD card. For example, a device lock password may conveniently be used to encrypt the associated shared secret. The device lock password may for example be an alphanumeric password which is typically received via user input to unlock the mobile device 201a.

The use of the device lock password to encrypt the shared secret may be strengthened in a number of ways, since user-generated passwords may typically be considered relatively weak. For example, the SharedSecret itself should appear to look just like random data so it would be difficult for an attacker to determine if the SharedSecret was successfully decrypted or not when performing a brute force attack. Generally, an attacker may only be able to determine if the SharedSecret was properly decrypted by attempting to use it. In another example, the enterprise service 144a may be configured to limit the number of failed reactivation attempts due to a SharedSecret mismatch. For example, after a failed number of attempts of entering the device lock password, where the number is relatively small to account for possible errors, the enterprise service 144a may thereafter take preventative action to stop a possible attack. Example actions include locking down the account, messaging the original device indicating possible identity theft, providing a kill signal to the mobile device, triggering a key rollover to generate a new master key and thus shared secret, etc.

Restoring of a stale backup rather than a failed attempted may be addressed by including identifiers of the master key used to generate the SharedSecret. Accordingly, a mismatch of keys would indicate a stale backup and an error can be raised instead of an attack warning.

At process 412, the uSD card is removed from the first mobile device 201a and interfaced for reading by the second mobile device 201b, for initiating of the transfer of service records for activation of the enterprise service 144a. For example, the security manager 272 of the second mobile device 201b may be configured to monitor the content of any inserted uSD card and if specified files relating to service transferring are detected, that application may prompt a user of the second mobile device 201b to determine whether the user wishes to perform a device switch. The actual steps involved in restoring user data and reactivating vary depending on the types of service(s) activated on the first mobile device 201, e.g., depending on whether the service records 227d relate to the enterprise service 144a or the secure Internet service 144b.

At process 414, if one or more service records 227d relate to the enterprise service 144a, the second mobile device 201b prompts the device user to enter the device lock password from the first mobile device 201a. The second mobile device 201b uses this password to decrypt the SharedSecret needed to reactivate the enterprise service 144a. Thus, at process 416, the second mobile device 201b sends the SharedSecret to the enterprise service 144a for authentication. If the SharedSecret is authenticated by the enterprise service 144a, at process 418, the enterprise service 144a sends the MasterKey1 to the second mobile device 201b for decryption of the BackupKey. As a security measure if a mismatch occurs in the SharedSecret provided by the second mobile device 201b to the service 144b, the service 144b may perform a security measure as described above. At process 420, the second mobile device 201b decrypts the encrypted BackupKey using MasterKey1; and at process 422 decrypts the encrypted data 227 using the (now decrypted) BackupKey.

In some embodiments, referring to process 430, the service records 227d are used in the second mobile device 201b to initiate a key generation exchange with the enterprise service 144a. The key exchange is used to negotiate a new master key ("MasterKey2"). The enterprise service 144a may also be informed of the new device PIN of the second mobile device 201b as part of the exchange so that data is routed to the correct device. At this point, the second mobile device 201b may be considered to be "activated" and successfully transferred with respect to the Enterprise service 144a.

When restoring data 227 the following order may be observed by the device: IT administrative policy settings 227a, user settings 227b, user data 227c, and service records 227d. It can be appreciated that such an order may be used to ensure any policy restrictions may be enforced immediately prior to any services 144 being fully activated so that they cannot be circumvented. Service records 227d are restored last because the injection of service records may trigger automatic slow synchronization handshakes with the service 144. By restoring the user settings 227b and user data 227c first the slower synchronization are delayed until the service records 227d are restored.

Referring now to FIG. 6, the example system 500 illustrates associated processes and communications which may occur as between the first mobile device 201a, the secure Internet service 144b, and the second mobile device 201b. Generally, when compared to the enterprise service 144a of system 400, in this system 500 the SharedSecret is encrypted using MasterKey1 rather than a LockPassword. Verification by the secure Internet service 144b is performed by authenticating specific accounts with application servers 150 (FIG. 1). In addition, the MasterKey1 and MasterKey2 are typically unique or specific to the secure Internet service 144b, for example, as indicated in Table 1, MasterKey1 is MasterKeyGBISXNA01 for the secure Internet service 144b, which is different from MasterKeyS12345 of the enterprise service 144a.

Referring now to process 502, a master key may be established as between the first mobile device 201a and the secure Internet service 144b. At process 504, the first mobile device 201a will generate a BackupKey, to encrypt user data 227 and store or backup the encrypted user data 227 onto the uSD card.

Referring now to process 506, in order to securely transfer the BackupKey from the first mobile device 201a to the second mobile device 201b, the BackupKey is encrypted, for example using the current master key MasterKey1, which is typically already established between the first mobile device 201a and the secure Internet service 144b.

Referring now to process 508, since the MasterKey1 associated with the secure Internet service 144b should not be copied off of the first mobile device 201a for security reasons, another encryption key is independently generated by the first mobile device 201 and the Internet service 144b, referred to as a shared secret key ("SharedSecret"), similar to that as described above with respect to enterprise service 144a (FIG. 5). For example, as described above with respect to FIG. 7, the SharedSecret may be generated by signing or encrypting specified service information using the MasterKey1.

Referring to process 510, the SharedSecret is sent or transferred using the uSD card. In this example, the MasterKey1 was used for encryption or signing of the SharedSecret.

At process 512, the uSD card is removed from the first mobile device 201a and interfaced for reading by the second mobile device 201b, for initiating of the transfer of service records for activation of the secure Internet service 144b. Note that the secure Internet service 144b can access and "knows" the SharedSecret (as it was already generated at process 508). At 518, the SharedSecret is sent to the secure Internet service 144b, for authentication by the secure Internet service 144b.

If the data 227 includes data in relation to one or more secure Internet services 144b, the security manager 272 is triggered in the second mobile device 201b and the user is prompted to enter the password for each of their account information in relation to the associated application servers 150 (FIG. 1). For each account successfully authenticated the secure Internet service 144b will return the required keys to restore both data and reactivate services. Upon successful authentication of the SharedSecret and from the various associated application servers 150, at process 514 the secure Internet service 144b sends the associated MasterKey1 to the second mobile device 201b for decryption of the BackupKey (process 520), and subsequently the data (process 522).

In some embodiments, referring to process 530, the service records 227d are used in the second mobile device 201b to initiate a key generation exchange with the secure Internet service 144b. The key exchange is used to negotiate a new master key MasterKey2. The secure Internet service 144b may also be informed of the new device PIN of the second mobile device 201b as part of the exchange so that data is routed to the correct device. At this point, the second mobile device 201b may be considered to be "activated" and successfully transferred with respect to the Internet service 144b.

While example operations of systems illustrated in FIGS. 5 and 6 have been described as occurring in a particular order, it will be appreciated to persons skilled in the art that some of the processes, messages or steps may be performed in a different order provided that the result of the changed order of any given step will not prevent or impair the occurrence of subsequent steps. Furthermore, some of the steps described above may be removed or combined in other embodiments, and some of the steps described above may be separated into a number of sub-steps in other embodiments. Even further, some or all of the processes, messages or steps may be repeated, as necessary.

It can be appreciated that, by having data associated with each individual service 144 encrypted using the BackupKey, the end result is that there may be multiple copies of the same BackupKey on the second mobile device 201b. As only one copy needs to be decrypted to retrieve the actual backup key, this may provide another level of verification based on redundancy. Keeping multiple copies may also simplify system design as there may be no need to choose which service should encrypt the backup key, and permits an easy removal or addition of services later by simply removing or adding a copy of the service encrypted backup key. This feature may also provide flexibility and modular implementation for other configurations, for example for partial device transfers. In such embodiments, data 227 is encrypted and backed up so that only specified services and their data can be restored to the second mobile device 201b. This partial device transfer may be applied to, for example, moving a personal mobile device to a corporate mobile device, or vice versa.

It can be appreciated that, in some example embodiments, only the mobile device 201 and/or the applicable services 144 may need be configured to implement aspects of the above-described embodiments. Thus, in such embodiments, existing application servers 150 may not require modification and may, in fact, be unaware of any such implementations or communications between the mobile devices 201a, 201b and/or the services 144.

It can be appreciated that the service 144 may perform additional functions not described herein, as would be understood to those skilled in the art. For example, some additional communications may occur between the services 144 and the application server 150 directly or indirectly via proxy nodes 160. For example, if the application server 150 includes a subscription-based service, there may be additional authentication communications between the services 144 and the application server 150, e.g., to verify account or password information for access to the service. Such additional communications would be understood in the art and not described in detail herein.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

While some of the present embodiments are described in terms of methods, a person of ordinary skill in the art will understand that present embodiments are also directed to various systems and apparatus such as a handheld electronic device including components for performing at least some of the aspects and features of the described methods, be it by way of hardware components, software or any combination of the two, or in any other manner. Moreover, an article of manufacture for use with the system, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

It can be appreciated that some example embodiments may be applied to instances where there is an existing trust relationship between a mobile communication device and a server, which may for example have a common shared key. For instance, some example embodiments may be applied to CDMA applications, for transferring phone numbers between devices wherein the device and network may be configured to each generated a shared key for switching mobile devices without requiring users to phone into an operator or network administrator.

Certain adaptations and modifications of the described embodiments can be made. Therefore, the above discussed embodiments are considered to be illustrative and not restrictive.

What is claimed is:

1. A method for transferring a service from a first mobile device to a second mobile device, the service being associated with a server configured for facilitating provisioning of services to mobile devices over a wireless communications network, the method comprising:
   generating, in the first mobile device, a shared key, the shared key being generated using a master key specific to the server and to the first mobile device, the master key being accessible by the server and by the first mobile device, wherein the shared key is independently computable by the first mobile device and by the server using the master key;
   sending data from the first mobile device to the second mobile device using an alternate communication mechanism independent from the server, the alternate communication mechanism including a short-range or direct electronic communication mechanism, the data including:
   said shared key; and
   one or more service records specific to the server to provision the service to the second mobile device, the one or more service records including information to be used by the second mobile device to establish communication with the service;
   receiving, by the server, the shared key from the second mobile device;
   authenticating, by the server, the shared key from the second mobile device; and
   sending the master key from the server to the second mobile device as a consequence to successful authentication.

2. The method as claimed in claim 1, wherein the shared key is independently generated by the server using the master key.

3. The method as claimed in claim 1, wherein said generating includes signing or encrypting specified data relating to the first mobile device using the master key, wherein said specified data is accessible by both the server and the first mobile device.

4. The method as claimed in claim 3, wherein said specified data includes a unique identifier of the first mobile device.

5. The method as claimed in claim 4, wherein said unique identifier includes at least one of a unique service identifier of the first mobile device and a unique personal identification number of the first mobile device.

6. The method as claimed in claim 5, wherein said generating includes concatenating the unique service identifier and the unique personal identification number.

7. The method as claimed in claim 1, further comprising, prior to said sending, encrypting or signing said shared key.

8. The method as claimed in claim 7, wherein said encrypting or signing of said shared key is performed using a lock password of the first mobile device.

9. The method as claimed in claim 1, the method further comprising:
   encrypting or signing data of the first mobile device using a first key resulting in encrypted or signed data;
   encrypting or signing the first key using the master key resulting in an encrypted or signed first key; and
   sending said encrypted or signed data and said encrypted or signed first key from the first mobile device to the second mobile device using the alternate communication mechanism independent from the server.

10. The method as claimed in claim 1, wherein said sending of said shared key using the alternate communication mechanism comprises storing said shared key to a removable memory, and removing said removable memory from the first mobile device for reading by the second mobile device.

11. A communication system, comprising:
   a first mobile device; and
   a server configured for facilitating provisioning of services to mobile devices, including the first mobile device, over a wireless communications network, wherein the server is configured for transferring service from the first mobile device by generating a shared key using a master key specific to the server and to the first mobile device, the master key being accessible by the server and by the first mobile device, wherein the first mobile device is configured for generating the shared key using the master key, and sending data to a second mobile device using an alternate communication mechanism independent from the server, the alternate communication mechanism including a short-range or direct electronic communication mechanism, the data including:

said shared key, wherein the shared key is independently computable by the first mobile device and by the server using the master key;

one or more service records specific to the server to provision the service to the second mobile device, the one or more service records including information to be used by the second mobile device to establish communication with the service;

wherein the server is further configured for:

receiving the shared key from the second mobile device, authenticating the shared key from the second mobile device, and sending the master key to the second mobile device as a consequence to successful authentication.

12. The method as claimed in claim 1, further comprising, after said authenticating, generating a second master key specific to the server and to the second mobile device.

13. The communication system as claimed in claim 11, wherein the server is further configured for, after said authenticating, generating a second master key specific to the server and to the second mobile device.

14. The communication system as claimed in claim 11, wherein said generating in the first mobile device includes signing or encrypting specified data relating to the first mobile device using the master key, wherein said specified data is accessible by both the server and the first mobile device.

15. The communication system as claimed in claim 14, wherein said specified data includes a unique identifier of the first mobile device.

16. The communication system as claimed in claim 15, wherein said unique identifier includes at least one of a unique service identifier of the first mobile device and a unique personal identification number of the first mobile device.

17. The communication system as claimed in claim 16, wherein said generating in the first mobile device includes concatenating the unique service identifier and the unique personal identification number.

18. The communication system as claimed in claim 11, wherein the first mobile device is further configured for, prior to said sending, encrypting or signing said shared key.

19. The communication system as claimed in claim 18, wherein said encrypting or signing of said shared key is performed using a lock password of the first mobile device.

20. The communication system as claimed in claim 11, wherein the first mobile device is further configured for:

encrypting or signing data of the first mobile device using a first key resulting in encrypted or signed data;

encrypting or signing the first key using the master key resulting in an encrypted or signed first key; and sending said encrypted or signed data and said encrypted or signed first key to the second mobile device using the alternate communication mechanism independent from the server.

21. The communication system as claimed in claim 11, wherein said sending of said shared key using the alternate communication mechanism includes storing said shared key to a removable memory for removal therefrom and for reading by the second mobile device.

22. The communication system as claimed in claim 11, further comprising said second mobile device.

* * * * *